(12) United States Patent
Weng

(10) Patent No.: US 11,526,229 B2
(45) Date of Patent: Dec. 13, 2022

(54) SENSING DEVICE

(71) Applicant: InnoLux Corporation, Miao-Li County (TW)

(72) Inventor: Tsan-Po Weng, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/504,522

(22) Filed: Oct. 19, 2021

(65) Prior Publication Data

US 2022/0155899 A1 May 19, 2022

(30) Foreign Application Priority Data

Nov. 18, 2020 (CN) .......................... 202011295089.0

(51) Int. Cl.
*G06F 3/041* (2006.01)

(52) U.S. Cl.
CPC .......... *G06F 3/0416* (2013.01); *G06F 3/0412* (2013.01); *G06F 2203/04108* (2013.01)

(58) Field of Classification Search
CPC ............... G06F 3/04166; G06F 3/0412; G06F 2203/04108
See application file for complete search history.

(56) References Cited

U.S. PATENT DOCUMENTS

| | | | |
|---|---|---|---|
| 2015/0070295 A1* | 3/2015 | Park | G06F 3/0446 345/174 |
| 2016/0179273 A1* | 6/2016 | Lee | G06F 3/0412 345/174 |
| 2016/0291679 A1* | 10/2016 | Jordan | G06F 1/3262 |
| 2017/0255299 A1* | 9/2017 | Shimoshikiryoh | G02F 1/133345 |
| 2020/0272329 A1* | 8/2020 | Tang | G06F 3/044 |
| 2020/0379594 A1* | 12/2020 | Chiang | G06F 3/04184 |
| 2021/0019034 A1* | 1/2021 | Kim | G06F 3/0446 |

FOREIGN PATENT DOCUMENTS

TW 202001533 A 1/2020

* cited by examiner

*Primary Examiner* — Liliana Cerullo
(74) *Attorney, Agent, or Firm* — Winston Hsu

(57) ABSTRACT

A sensing device having a hover mode is provided. The sensing device includes a substrate; and a plurality of sensing electrodes, disposed on the substrate, and defined as a plurality of hovering units in the hover mode, wherein the plurality of hovering units comprise a first hovering unit, and sensing electrodes with signals in the first hovering unit form a first identification pattern.

16 Claims, 5 Drawing Sheets

SENSING DEVICE

BACKGROUND OF THE DISCLOSURE

1. Field of the Disclosure

The present disclosure relates to a sensing device, and more particularly, to a sensing device with a hover mode.

2. Description of the Prior Art

The touch display device is divided into "plug-in" and "embedded" while "embedded" is divided into "In-cell" and "On-cell". In the In-cell touch display device, mutual capacitance sensing mechanism or self capacitance sensing mechanism may be applied, wherein a display mode and a touch mode may be driven in time division. When hovering on the cover glass, touching on the plastic cover or wearing a thick glove to operate, the user operates via air, plastic, or a glove with small dielectric constants, and thus the sense signal is weak and signal-to-noise ratio is poor, so that it is difficult to make effective touch determination.

Therefore, there is still a need to develop a sensing device to improve the above problems.

SUMMARY OF THE DISCLOSURE

The present disclosure provides a sensing device having a hover mode. The sensing device includes a substrate; and a plurality of sensing electrodes, disposed on the substrate, and defined as a plurality of hovering units in the hover mode, wherein the plurality of hovering units comprise a first hovering unit, and sensing electrodes with signals in the first hovering unit form a first identification pattern.

The present disclosure further provides a sensing method for a sensing device. The sensing device includes a substrate, and a plurality of sensing electrodes disposed on the substrate. The plurality of sensing electrodes are defined as a plurality of hovering units in a hover mode, and the plurality of hovering units comprise a first hovering unit. The sensing method includes providing a portion of sensing electrodes with signals to form a first identification pattern in the hover mode; and identifying the first identification pattern.

These and other objectives of the present disclosure will no doubt become obvious to those of ordinary skill in the art after reading the following detailed description of the embodiment that is illustrated in the various figures and drawings.

DETAILED DESCRIPTION

Figure 1:
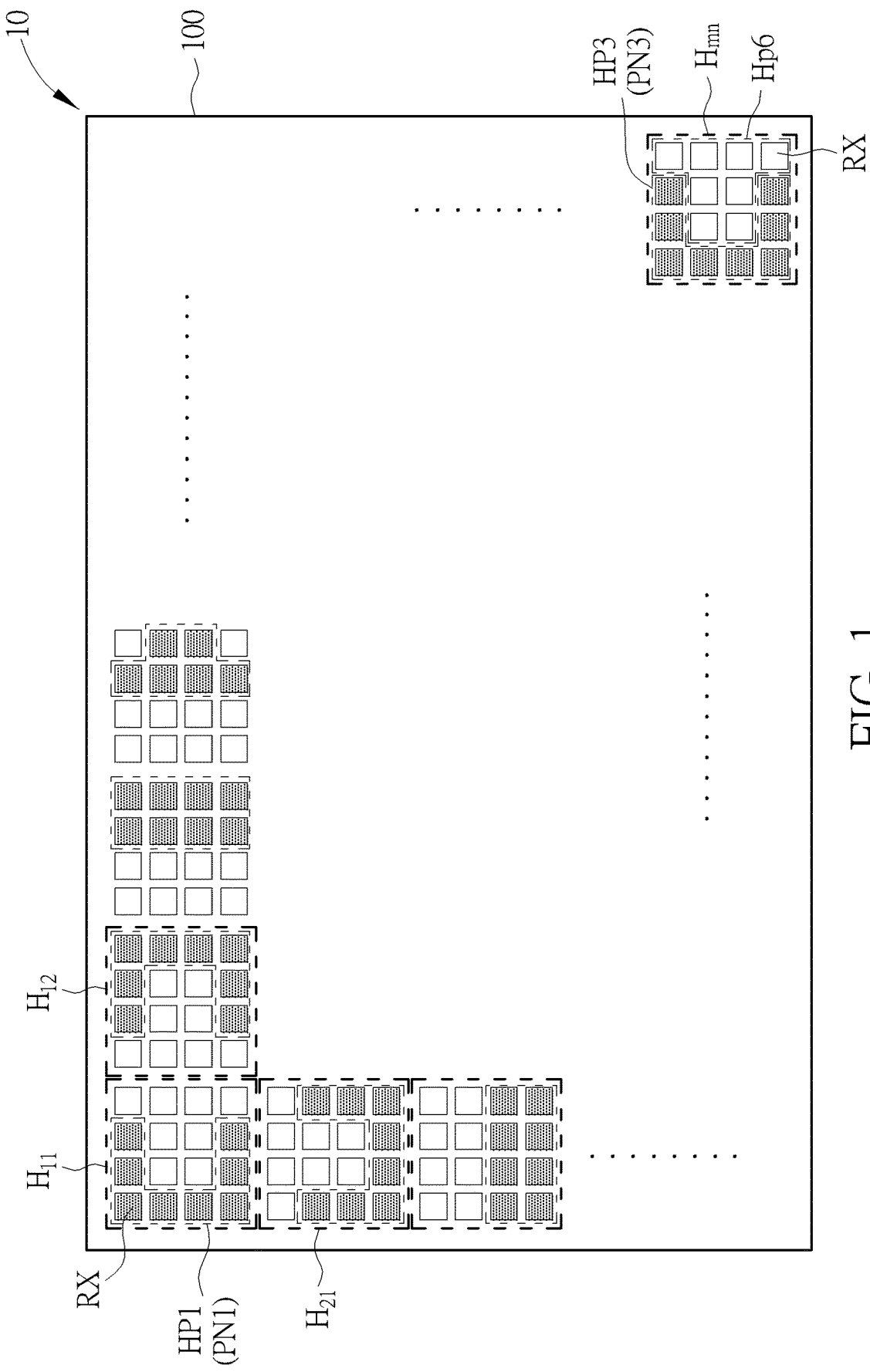
FIG. 1 is a schematic diagram of a sensing device according to an embodiment of the present disclosure.

The present disclosure has been specifically shown and described with reference to the embodiments and specific features thereof. The embodiments set forth below should be regarded as illustrative rather than restrictive. It is obvious to those skilled in the art that various changes and modifications in form and details can be made without departing from the spirit and scope of the present disclosure.

Before further describing the embodiments, the following describes specific terms used in the full text.

The terms "on," "above," and "over" used herein should be interpreted in the broadest manner such that "on," "above," and "over" not only means "directly on" something but also includes the meaning of "on," "above," and "over" something with an intermediate feature or a layer therebetween, and that "directly on," "directly above," and "directly over" not only means the meaning of "on," "above," and "over" something but can also include the meaning it is "on," "above," and "over" something with no intermediate feature or layer therebetween (i.e., directly on something).

Furthermore, terms "bottom", "below", "above" "top" describe relative position of the different elements in figures. However, when figures are flipped upside down, foregoing the "top" become "bottom". It should be understood that in addition to the directions shown in the figures, the spatially relative terms are intended to cover different directions of the device in use or operation.

The terms "formed" or "disposed" are used in the following to describe the act of applying material layers to a substrate. These terms are intended to describe any feasible layer formation technique, including but not limited to thermal growth, sputtering, evaporation, chemical vapor deposition, epitaxial growth, electroplating, etc.

The ordinal numbers used in the description and claims, such as "first", "second", etc., are used to modify the element of claims. It does not imply and represent that the claimed element has any previous ordinal number, and it does not represent a sequence of a claimed element and another claimed element, or a sequence in the process. The use of these ordinal numbers is only used to make a clear distinction between a claimed element and another claimed element with the same name.

It should be understood that although the terms first, second, etc. may be used herein to describe various elements, components, regions, layers or/and parts, these elements, components, regions, layers or/and parts should not be limited by these terms. These terms are only used to distinguish one element, component, region, layer or/and part from another element, component, region, layer or/and part. Therefore, without departing from the teachings of the present disclosure, the first element, the first component, the first region, the first layer, or the first part discussed below may also be referred to as the second element, the second component, or the second region, the second layer or the second part.

In addition, phrases such as "within the range between the first value and the second value" indicates that the range includes the first value, the second value, and other values between them.

It should be understood that multiple embodiments are listed below to illustrate different technical features, but these technical features may be mixed or combined in different ways without conflicting with each other.

Certain terms are used in the specification and claims to refer to specific components. However, those skilled in the art of the present disclosure should understand that manufacturers may use different terms to refer to the same component. Moreover, this specification and claims do not use the difference in names as a way of distinguishing components, but uses the overall technical difference of the components as the criterion for distinguishing.

The "comprising" mentioned in the entire specification and claims is an open term, so it should be interpreted as "including but not limited to". When the terms "including" and/or "having" are used in this specification, they specify the existence of the features, regions, steps, operations, and/or elements, but do not exclude one or more existence or addition of other features, regions, steps, operations, elements, and/or combinations thereof.

Furthermore, the term "coupling" here includes any direct and indirect connection means. Therefore, if it is described that a first device is coupled to a second device, it means that the first device may be directly connected to the second device, or may be indirectly connected to the second device through other devices or other connection means.

In order to enable those skilled in the art to better understand the disclosure, the following specifically enumerates the embodiments of the disclosure, together with the accompanying drawings, to describe in detail the content of the disclosure and the effects to be achieved. It should be noted that the drawings are simplified schematic diagrams. Therefore, only the elements and combination relationships related to the present disclosure are shown, and some elements are omitted to provide a clearer description of the basic structure or implementation method of the present disclosure. The components and layout may be more complicated.

In addition, for the convenience of description, the components shown in the drawings of the present disclosure are not drawn to the same proportions as the actual numbers, shapes, and sizes of the components, and the detailed proportions can be adjusted according to design requirements.

The electronic device disclosed in the present disclosure may include, for example, a display device, an antenna device, a sensing device, a touch display device, a curved electronic device or a free shape display device, or a spliced electronic device, but not limited to this. The electronic device may include, for example, a thin film transistor (TFT) having a semiconductor material, and a top gate transistor, a bottom gate transistor, a double gate transistor or a dual gate thin film transistor having semiconductor material such as amorphous silicon, low temperature poly-silicon (LTPS) or metal oxide, or a combination of the above material, but is not limited to these. In some embodiments, different thin film transistors may have the above-mentioned different semiconductor materials. The electronic device, for example, may include liquid crystal, fluorescence, phosphor, quantum dot (QD), other appropriate display medium or any combination of the above, but not limited thereto. The light-emitting diode may include, for example, organic light-emitting diode (OLED), inorganic light-emitting diode, micro light-emitting diode (micro-LED), sub-millimeter light-emitting diode (mini-LED) or a quantum dot (QD) light emitting diode (e.g. may be QLED, QDLED), or other suitable of materials, or any combination of the above, but not limited thereto. In some embodiments of the present disclosure, the size of the micro light-emitting diode may be minimized to a micrometer-level, so that the light-emitting diode may have a size of 300 micrometers (μm)×300 μm, 30 μm×30 μm, or a cross-sectional area of 10 μm×10 μm, but not limited to this. The electronic device of the present disclosure may be any combination of the above, but not limited thereto. The appearance of the electronic device may be rectangular, circular, polygonal, a shape with curved edges, or other suitable shapes. The electronic device may have a drive system, control system, a light source system, shelving systems and other peripheral systems to support the display device or an antenna device. The electronic device of the present disclosure may be used in electronic products capable of displaying images, such as notebook computers and smart phones, but is not limited to this. The following will take the sensing device as an example.

Figure 2:
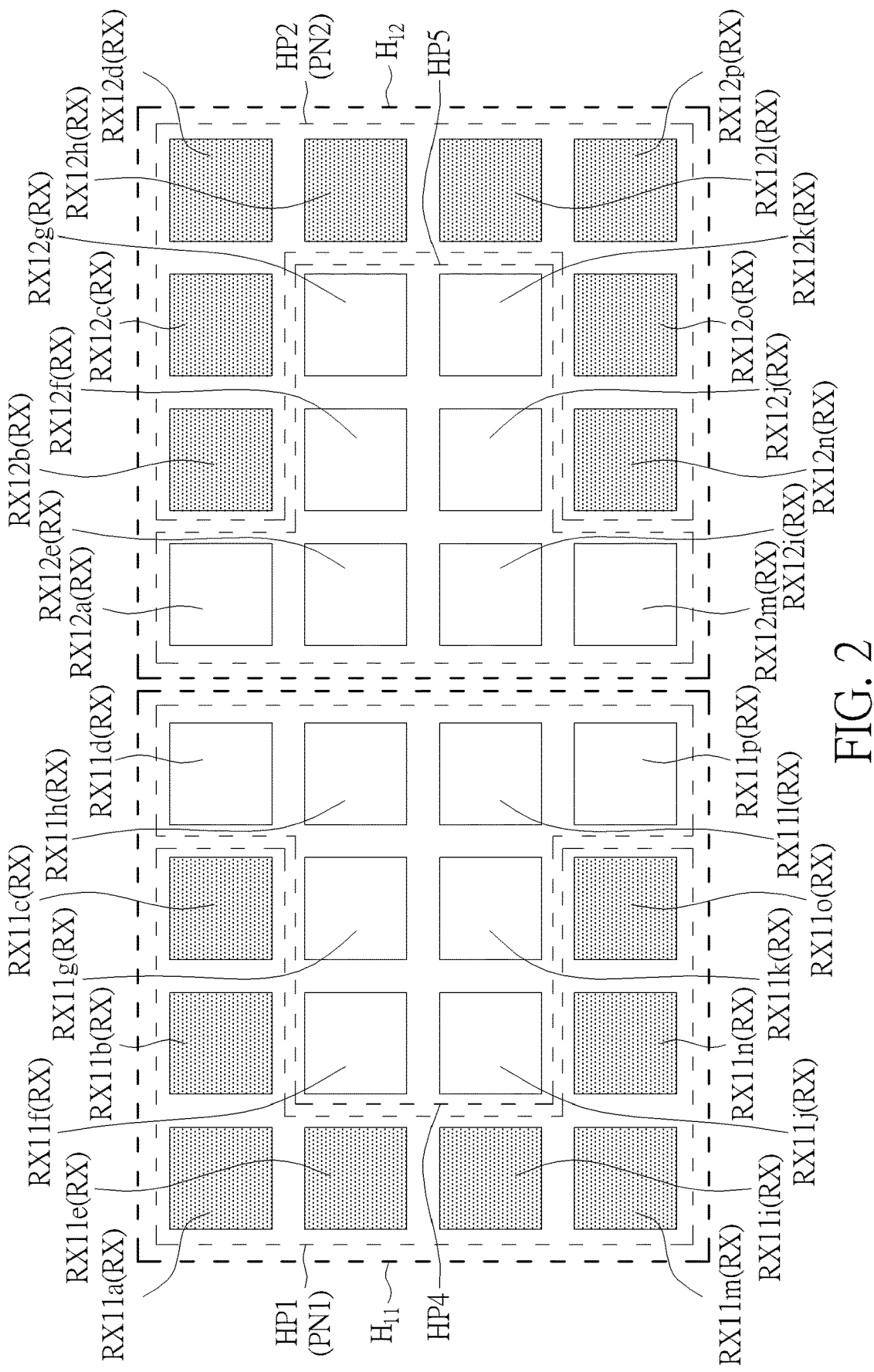
FIG. 2 is a schematic diagram of a partial enlargement of the sensing device shown in FIG. 1.

Please refer to FIG. 1 and FIG. 2. FIG. 1 is a schematic diagram of a sensing device 10 according to an embodiment of the present disclosure, and FIG. 2 is a schematic diagram of a partial enlargement of the sensing device 10 shown in FIG. 1. The sensing device 10 may be an electronic device. As shown in FIG. 1, the sensing device 10 includes a substrate 100 and a plurality of sensing electrodes RX disposed on the substrate 100. The sensing device 10 may have a hover mode. In the hover mode, the sensing electrodes RX may be defined as (or grouped into) a plurality of hovering units. The plurality of hovering units may include: a first hovering unit $H_{11}$, a second hovering unit $H_{12}$, ..., a hovering unit $H_{mn}$, wherein m, n are positive integers. The plurality of hovering units may be arranged in arrays, but not limited thereto. Please refer to FIG. 1 and FIG. 2, the first hovering unit $H_{11}$ may include sensing electrodes with signals, to form a first identification pattern PN1. Specifically, as shown in FIG. 2, a portion which is surrounded by a dashed box and dotted in the first hovering unit $H_{11}$ is a first portion HP1 of sensing electrodes. In the hover mode, the first portion HP1 of sensing electrodes have signals, and form a plurality of first identification sensing electrodes, and the first identification sensing electrodes have the first identification pattern PN1. As shown in FIG. 1 and FIG. 2, the number of the first portion HP1 of sensing electrodes is 8 as an example, but the number is not limited thereto. According to another embodiment, the number of the first portion HP1 of sensing electrodes may be designed according to practical situation and requirements of the sensing device 10.

In detail, as shown in FIG. 2, the first hovering unit $H_{11}$ may include 16 sensing electrodes RX, i.e., the sensing electrode RX11a to the sensing electrode RX11p, but the present disclosure is not limited thereto. In other embodiments, each hovering unit may have other numbers of sensing electrodes, and each hovering unit may also have a respective number of sensing electrodes. In the 16 sensing electrodes RX of the first hovering unit $H_{11}$, the first portion HP1 of sensing electrodes RX11a, RX11b, RX11c, RX11e, RX11i, RX11m, RX11n, RX11o have signals in the hover mode. According to another embodiment, the number of sensing electrodes of the first hovering unit $H_{11}$ may be designed according to practical situation and requirements of the sensing device 10.

In detail, as shown in FIG. 2, a second hovering unit $H_{12}$ may include 16 sensing electrodes RX, i.e., the sensing electrode RX12a to the sensing electrode RX12p, but the present disclosure is not limited thereto. In other embodiments, each hovering unit may have other numbers of sensing electrodes, and each hovering unit may also have a respective number of sensing electrodes. Please refer to FIG. 1 and FIG. 2, the second hovering unit $H_{12}$ may include sensing electrodes with signals, to form a second identification pattern PN2. Specifically, a portion that is surrounded by a dashed box and is dotted in the 16 sensing electrodes RX of the second hovering unit $H_{12}$ is a second portion HP2 of sensing electrodes. In the hover mode, the second portion HP2 of the sensing electrodes RX12b, RX12c, RX12d, RX12h, RX12l, RX12n, RX12o and RX12p have signals, and form a plurality of second identification sensing electrodes. The second identification sensing electrodes have a second identification pattern PN2.

The sensing device 10 may have a display mode, a touch mode and/or a hover mode. The display mode of the sensing device 10 is configured to display images. When the sensing device 10 operates in the display mode, sensing electrodes RX of the hovering unit $H_{11}$ to the hovering unit $H_{mn}$ may function as a common electrode for providing a reference voltage level. In the touch mode, a pointing object (such as a finger or a stylus) directly touches the sensing device 10. In the hover mode, the object does not directly touch the sensing device 10.

The touch mode and the hover mode of the sensing device 10 are configured to detect an object. When the sensing device 10 is operated in the touch mode, sensing electrodes RX of the hovering unit $H_{11}$ to the hovering unit $H_{mn}$ may have signals. In other words, after receiving a touch driving signal, one sensing electrode RX may output a touch sensing signal. Since touch sensing signal(s) when touched by the object is different from touch sensing signal(s) when not touched by the object, it may determine whether the sensing electrode RX is touched by the object.

When the sensing device 10 is operated in the hover mode, only a portion of the sensing electrodes RX may have signals. In other words, only a portion of the sensing electrodes RX output sensing signals after receiving hovering driving signals. In addition, sensing signal(s) when touched by the object is different from sensing signal(s) when not touched by the object. The other portion of the sensing electrode(s) RX may not receive any hovering driving signal, and may not output sensing signals.

Specifically, sensing electrodes RX of the hovering unit $H_{11}$ to the hovering unit $H_{mn}$ may be divided into sensing electrodes RX marked with dots as shown in FIG. 1 (also referred to as identification sensing electrodes) and sensing electrodes RX with white backgrounds as shown in FIG. 1 (also referred to as non-identification sensing electrodes). In some embodiments, in a hovering unit, only the identification sensing electrodes will receive hovering driving signal(s) at a driving time and output the sensing signals at a detecting time, and the non-identification sensing electrode may not receive any hovering driving signal at a driving time and may not output the sensing signals at a detecting time.

For example, the hovering unit $H_{11}$ (also referred to as the first hovering unit) may include a first portion HP1 (marked with dots) of sensing electrodes RX and a fourth portion HP4 (with white backgrounds) of sensing electrodes RX. In the hover mode, the sensing electrode RX11a, the sensing electrode RX11b, the sensing electrode RX11c, the sensing electrode RX11e, the sensing electrode RX11i, the sensing electrode RX11m, the sensing electrode RX11n and the sensing electrode RX11o of the first portion HP1 of the hovering unit $H_{11}$ have signals and form a plurality of identification sensing electrodes (also referred to as first identification sensing electrodes), and the plurality of first identification sensing electrodes have an identification pattern PN1 (also referred to as the first identification pattern). In the hover mode, the sensing electrode RX11c, the sensing electrode RX11f, the sensing electrode RX11g, the sensing electrode RX11h, the sensing electrode RX11k, the sensing electrode RX11l and the sensing electrode RX11p of the fourth portion HP4 of the hovering unit $H_{11}$ (also referred to as the first non-identification sensing electrodes) does not have signals.

According to some embodiments, in the touch mode, the sensing electrode RX11c, the sensing electrode RX11f, the sensing electrode RX11g, the sensing electrode RX11h, the sensing electrode RX11k, the sensing electrode RX11k, the sensing electrode RX11l and the sensing electrode RX11p of the fourth portion HP4 may have signals. However, in the hover mode, the sensing electrode RX11c, the sensing electrode RX11f, the sensing electrode RX11g, the sensing electrode RX11h, the sensing electrode RX11k, the sensing electrode RX11k, the sensing electrode RX11l, and the sensing electrode of the fourth portion HP4 RX11p may not have signals.

As described above, in some embodiments, the hovering unit $H_{11}$ includes 16 sensing electrodes RX which may be divided into 8 identification sensing electrodes (i.e., the sense electrode RX11a, the sensing electrode RX11b, the sensing electrode RX11c, the sensing electrode RX11e, the sensing electrode RX11i, the sensing electrode RX11m, the sensing electrode RX11n and the sensing electrode RX11o) and 8 non-identification sensing electrodes (i.e., the sensing electrode RX11c, the sensing electrode RX11f, the sensing electrode RX11g, the sensing electrode RX11h, the sensing electrode RX11k, the sensing electrode RX11k, the sensing electrode RX11, and the sensing electrode RX11p), but the present disclosure is not limited thereto. In other embodiments, the hovering unit $H_{11}$ may include other numbers of sensing electrodes RX, and may also include other numbers of identification sensing electrodes and non-identification sensing electrodes. For example, in other embodiments, the hovering unit $H_{11}$ may include 16 sensing electrodes R which is divided into 6 identification sensing electrodes and 10 non-identification sensing electrodes. Moreover, in some embodiments, the number of identification sensing electrodes and the number of non-identification sensing electrodes of the hovering unit $H_{11}$ may also be different from the number of identification sensing electrodes and the number of non-identification sensing electrodes of another hovering unit.

In an embodiment, hovering units arranged adjacently may have different identification patterns. For example, the hovering unit $H_{12}$ (also referred to as the second hovering unit) may include a second portion HP2 of sensing electrode RX (marked by dots) and a fifth portion HP5 of sensing electrodes RX (with white backgrounds). In the hover mode, the sensing electrode RX12b, the sensing electrode RX12c, the sensing electrode RX12d, the sensing electrode RX12h, the sensing electrode RX12l, the sensing electrode RX12n, the sensing electrode RX12o and the sensing electrode RX12p of the second portion HP2 of the hovering unit $H_{12}$ have signals and form a plurality of identification sensing electrodes (also referred to as the second identification sensing electrodes), and the plurality of second identification sensing electrodes have an identification pattern PN2 (also referred to as the second identification pattern). In the hover mode, the sensing electrode RX12a, the sensing electrode RX12e, the sensing electrode RX12f, the sensing electrode RX12g, the sensing electrode RX12i, the sensing electrode RX12j, the sensing electrode RX12k and the sensing electrode RX12m of the fifth portion HP5 of the hovering unit $H_{12}$ (may also be referred to as the fifth non-identification sensing electrodes) may not have signals. According to some embodiments, in the touch mode, the fifth portion HP5 of sensing electrodes RX of the hovering unit $H_{12}$ may have signals. In one embodiment, the hovering unit $H_{11}$ and the hovering unit $H_{12}$ may be arranged adjacently, and the identification pattern PN1 of the hovering unit $H_{11}$ and the identified patterns PN2 of the hovering unit $H_{12}$ may be different. Two hovering units arranged adjacently means that no other hovering units are arranged between the two hovering units. For example, as shown in FIG. 2, the identification pattern PN1 may be C-shaped, and the identification pattern PN2 may be inverted C-shaped. That is, the identification pattern PN1 and the identification pattern PN2 may be laterally reversed (flipped). Here, the identification pattern is only for example, and the identification pattern is not limited to this.

In an embodiment, two non-adjacently arranged hovering units may have an identical identification pattern. For example, as shown in FIG. 1, the hovering unit $H_{mn}$ (also referred to as the third hovering unit) may include a third portion HP3 of sensing electrodes RX (marked by dots) and a sixth portion HP6 of sensing electrodes RX (with white backgrounds). In the hover mode, the third portion HP3 of sensing electrodes RX of the hovering unit $H_{mn}$ have signals and form a plurality of identification sensing electrodes (may also be referred to as third identification sensing electrodes). The plurality of third identification sensing electrodes have an identification pattern PN3 (may also be referred to as a third identification pattern). In the hover mode, the sixth portion HP6 of sensing electrodes RX of the hovering unit $H_{mn}$ (may also be referred to as the sixth non-identification sensing electrodes) may not have signals. According to some embodiments, in the touch mode, the sixth portion HP6 of sensing electrodes RX of the hovering unit may have signals. In an embodiment, the hovering unit $H_{11}$ and the hovering unit may be arranged non-adjacently, and the identification pattern PN1 of the hovering unit $H_{11}$ and the identification pattern PN3 of the hovering unit $H_{mn}$ may be identical. For example, the identification pattern PN1 may be C-shaped, and the identification pattern PN3 may also be C-shaped.

The following explains that the present disclosure may improve signal quality. In non-contact touch (for example, touching/controlling the sensing device 10 through air, plastic or gloves with a small dielectric constant), the touch sensing signal in the touch mode may be weak, resulting in a poor signal to noise ratio. It is difficult to effectively perform touch determination, so the sensing device 10 may be switched from the touch mode to the hover mode. In other words, the sensing device 10 in the touch mode is useful for identifying direct touch of an object (for example, a finger). The sensing device 10 in the hover mode is useful for identifying non-contact touch of an object (for example, a finger). That is, the object does not directly touch the sensing device 10, but approaches the sensing device 10 in a hovering manner. In one embodiment, since the user operates via air, plastic or gloves with a small dielectric constant, the touch sensing signal in the touch mode is weak, for example, which may be about 8 to 10 times weaker than the signal strength of the touch sensing signal generated by directly touching a glass cover in the touch mode. Therefore, it may switch to the hover mode to improve the signal quality. That is to say, when the sensing device 10 is approached through a material with a small dielectric constant (for example, when hovering to operate a glass cover, when hovering to operate a plastic cover, or when operating with thick gloves), the sensing device 10 may be operated in the hover mode.

The following explains how the hover mode improves signal quality. In one embodiment, in the hover mode, the sensing device 10 may add the sensing signals detected by the identification sensing electrodes of the hovering unit up as the corresponding hovering sensing signal to increase the signal strength. For example, in the hover mode, the plurality of identification sensing electrodes of the hovering unit $H_{11}$ (i.e., the sense electrode RX11a, the sensing electrode RX11b, the sensing electrode RX11c, the sensing electrode RX11e, the sensing electrode RX11i, the sensing electrode RX11m, the sensing electrode RX11n and the sense electrode RX11o) respectively detect sensing signals (may also be referred to as first sensing signals). The sensing signals respectively detected by the plurality of sensing electrodes are added up to have signal strength equal to the signal strength of a hovering sensing signal. That is to say, according to some embodiments, taking the hovering unit $H_{11}$ as an example, the hovering sensing signal of the hovering unit $H_{11}$ may be the sum of the sensing signals respectively detected by all identification sensing electrodes (i.e., the sensing electrode RX11a, the sensing electrode RX11b, and the sensing electrode RX11c, the sensing electrode RX11e, the sensing electrode RX11i, the sensing electrode RX11m, the sensing electrode RX11n and the sensing electrode RX11o). Compared with detection with a single sensing electrode RX, combining a plurality of sensing electrodes RX into a hovering unit (for example, the hovering unit $H_{11}$) for detection may increase the signal strength.

In some embodiments, a sensing signal detected when touched by an object or disturbed by noise are different from/unequal to a sensing signal (i.e., a sensing signal reference) detected when not touched by an object or not disturbed by noise. According to whether the plurality of sensing electrodes RX of the detected signal strengths form an identification pattern, it may determine whether the sensing device 10 is touched by an object or disturbed by noise. For example, in some embodiments, in the hover mode, when all identification sensing electrodes of the hovering unit $H_{11}$ (i.e., the sensing electrode RX11a, the sensing electrode RX11b, the sensing electrode RX11c, the sensing electrode RX11e, the sensing electrode sensing electrode RX11i, the sensing electrode RX11m, the sensing electrode RX11n and the sensing electrode RX11o) have respective detected sensing signals with signal strength different from the sensing signal reference, and these identification sensing electrodes form the identification pattern PN1, the sensing device 10 may determine that the sensing device 10 is touched by an object. In the hover mode, when only partial identification sensing electrodes of the hovering unit $H_{11}$ (e.g., the sensing electrode RX11a and the sense electrode RX11o) have detected sensing signals with signal strength different from the sensing signal reference, and thus these identification sensing electrodes (such as the sensing electrode RX11a and the sensing electrode RX11o) cannot form/conform to the identification pattern PN1, the sensing device 10 may determine that the sensing device 10 is disturbed by noise, and determine that the sensing device 10 is not touched by an object. In this way, the sensing device 10 may filter out noise, thereby improving the signal to noise ratio to effectively perform touch determination.

In other embodiments, the sensing device 10 in the hover mode may be touched by the object during a first detecting time and a second detecting time when the sensing electrodes RX perform detection. Due to the touch of the object, all identification sensing electrodes of the hovering unit $H_{11}$ (i.e., the sensing electrode RX11a, the sensing electrode RX11b, the sensing electrode RX11c, the sensing electrode RX11e, the sensing electrode RX11i, the sensing electrode RX11m, the sensing electrode RX11n and the sensing electrode RX11o) may have respective detected sensing signals with signal strength continuously greater than the sensing signal reference during the first detecting time. Further, due to the touch of the object, all identification sensing electrodes of the hovering unit $H_{11}$ may have respective detected sensing signals with signal strength greater than the sensing signal reference during the second detecting time. In contrast, because noise is randomly distributed in time and space, when the sensing device 10 is not touched by an object but is only disturbed by noise, only partial identification sensing electrodes (such as the sensing electrode RX11a and the sensing electrode RX11o) have detected sensing signals with signal strength greater than the sensing signal reference during the first detecting time, or only partial identification sensing electrodes (such as the sensing electrode RX11b and the sensing electrode RX11m) have detected sensing signals with signal strength greater than the sensing signal reference during the second detecting time, while other identification sensing electrodes have detected sensing signals with signal strength less than the sensing signal reference.

According to some embodiments, in the hover mode, when all the identification sensing electrodes of the hovering unit $H_{11}$ (i.e., the sensing electrode RX11a, the sensing electrode RX11b, the sensing electrode RX11c, the sensing electrode RX11e, the sensing electrode RX11i, the sensing electrode RX11m, the sensing electrode RX11n and the sensing electrode RX11o) have detected sensing signals with signal strength greater than the sensing signal reference during a detecting time, the sensing signals detected by all the identification sensing electrodes of the hovering unit may be added up as a corresponding hovering sensing signal. In the hover mode, when at least one identification sensing electrode of the hovering unit $H_{11}$ (e.g., the sensing electrode RX11b) have detected sensing signal with signal strength less than the sensing signal reference during a sensing time, sense signals may be regarded as noise and filtered out.

In order to increase signal strength, in one embodiment, the signal strength of the hovering driving signal applied to a sensing electrode RX may be increased. The signal strength of sensing signal of a sensing electrodes RX in the hover mode (may also be called a first sensing signal) may be greater than the signal strength of the touch sensing signal of a sensing electrode RX in the touch mode (also referred to as a second sensing signal). For example, the identification sensing electrodes corresponding to the identification pattern PN1 (i.e., the sensing electrode RX11a, the sensing electrode RX11b, the sensing electrode RX11c, the sensing electrode RX11e, the sensing electrode RX11i, the sensing electrode RX11m, the sensing electrode RX11n and the sensing electrode RX11o) are driven by a plurality of touch driving signals in the touch mode and driven by a plurality of hovering driving signals in the hover mode. The signal strength of the hovering driving signal in the hover mode may be greater than the signal strength of the touch driving signal in the touch mode. According to some embodiments, for a sensing electrode RX, compared to the touch driving signal in the touch mode, the hovering driving signal in the hover mode may have higher voltage, larger current, or more pulses. For example, for an identification sensing electrode (such as the identification sensing electrode RX11a), the first voltage of the hovering driving signal in the hover mode may be higher than the second voltage of the touch driving signal in the touch mode. For the identification sensing electrode RX11a, the first current of the hovering drive signal in the hover mode may be greater than the second current of the touch driving signal in the touch mode. For the identification sensing electrode RX11a, the number of first pulses of the hovering drive signal in the hover mode may be more than the number of second pulses of the touch drive signal in the touch mode.

The above are only the embodiments of the present disclosure, and those skilled in the art may make various changes and modifications accordingly. The following will describe different embodiments of the present disclosure, and to simplify the description, the following description will not repeat identical parts. Furthermore, the same components in each embodiment of the present disclosure are denoted by the same symbols, to facilitate comparison between various embodiments.

Figure 3:
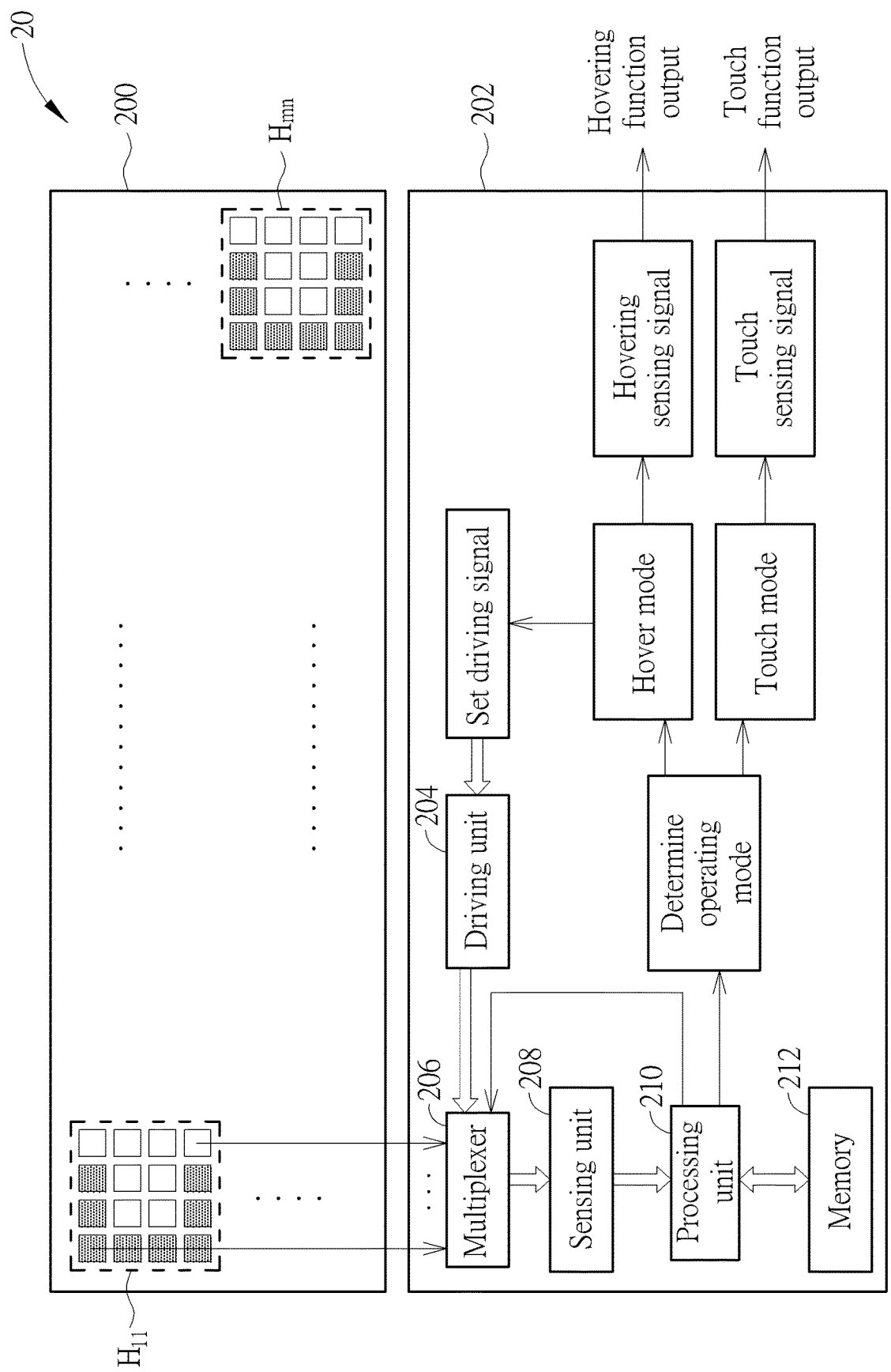
FIG. 3 is a schematic diagram of a sensing device according to an embodiment of the present disclosure.

Please refer to FIG. 3. FIG. 3 is a schematic diagram of a sensing device 20 according to an embodiment of the present disclosure. The structure of the sensing device 20 shown in FIG. 3 is similar to that of the sensing device 10 shown in FIG. 1, so the same components are represented by the same symbols. The sensing device 20 may be a touch display device. As shown in FIG. 3, the sensing device 20 may include a touch display panel 200 and a driving circuit 202. The driving circuit 202 may be electrically connected to the touch display panel 200. According to some embodiments, the driving circuit 202 may be a touch and display driver integration (TDDI) chip 202. The touch display panel 200 may include a substrate 100 and sensing electrodes RX. As described above, the sensing electrodes RX may be grouped into the hovering unit $H_{11}$ to the hovering unit $H_{mn}$. The touch display panel 200 may be an in-cell touch display panel. In this case, the sensing electrodes RX may be integrated in the display element of the touch display panel. According to some embodiments, in the display mode, the sensing electrodes RX may function as a common electrode. That is, the common electrode and the sensing electrodes RX may be the same element. The touch and display driver integration chip 202 may integrate the touch chip and the display chip into a single chip. The touch and display driver integration chip 202 may include a driving unit 204, a multiplexer 206, a sensing unit 208, a processing unit 210, and a memory 212. All of the sensing electrodes RX of the hovering unit $H_{11}$ may be coupled to the multiplexer 206, but for the sake of brevity, FIG. 3 illustrates only partial sensing electrodes RX of the hovering unit $H_{11}$ are coupled to the multiplexer 206. The memory 212 may store a plurality of identification patterns. The processing unit 210 may be configured to identify patterns.

Figure 4:
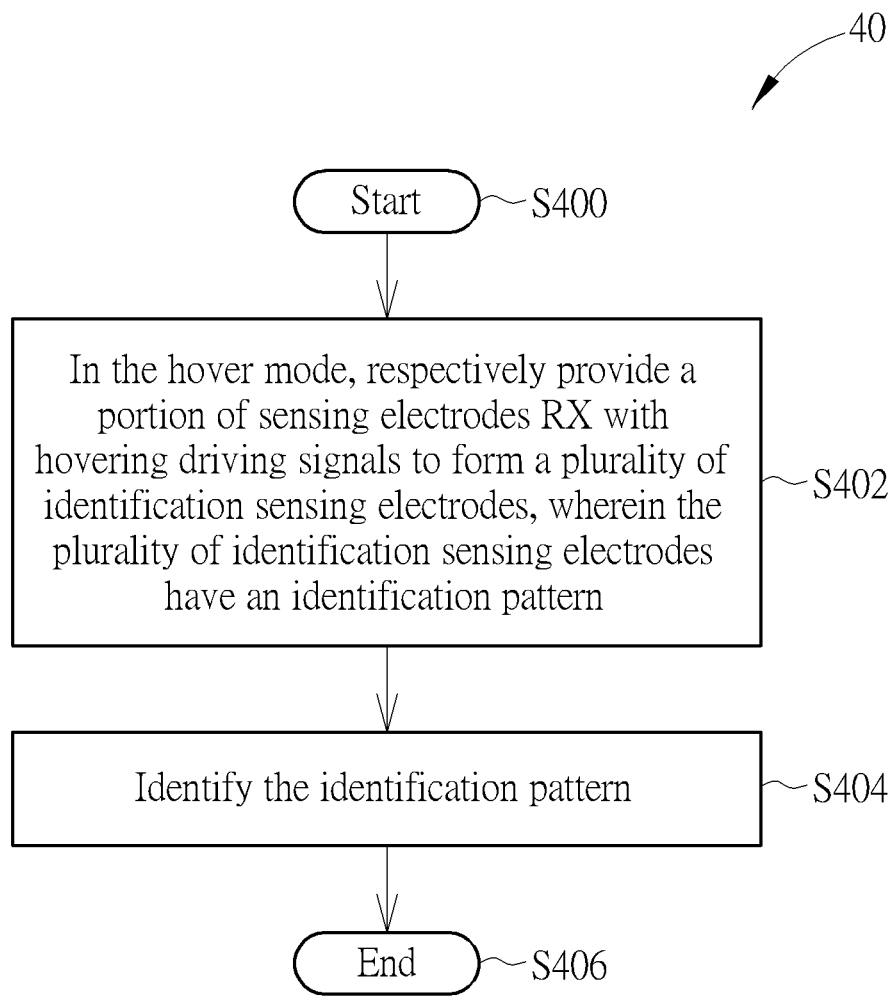
FIG. 4 is a schematic diagram of a sensing method according to an embodiment of the present disclosure.

FIG. 4 is a schematic diagram of a sensing method 40 according to an embodiment of the present disclosure. In some embodiments, the operation of the sensing device 20 may be summarized as the sensing method 40 as shown in FIG. 4, which may include the following steps:

Step S400: Start.

Step S402: In the hover mode, respectively provide a portion of sensing electrodes RX with hovering driving signals to form a plurality of identification sensing electrodes, wherein the plurality of identification sensing electrodes have an identification pattern.

Step S404: Identify the identification pattern.

Step S406: End.

The steps of the touch panel operation method are described in detail as follows.

As mentioned above, the sensing device 20 may be operated in the touch mode or the hover mode. When operated in the touch mode, the driving unit 204 respectively transmits touch driving signals to the sensing electrodes RX, and then performs touch function output according to the touch sensing signals detected by the sensing electrodes RX. In one embodiment, when operated in the hover mode, the drive unit 204 respectively transmits the hovering driving signals to the identification sensing electrodes (the first portion HP1 of the hovering unit $H_{11}$ as shown in FIG. 2), but does not transmit any hovering driving signal to the non-identification sensing electrodes (the fourth portion HP4 of the hovering cell $H_{11}$ as shown in FIG. 2), and then performs hovering function output according to sensing signal(s) respectively detected by the identification sensing electrode(s).

In one embodiment, when operated in the hover mode, the processing unit 210 may read each identification pattern of each hovering unit from the memory 212 (e.g., obtaining information that the hovering unit $H_{11}$ corresponds to the identification pattern PN1). The processing unit 210 may set the signal strength of the hovering driving signal (for example, adjust the voltage, current, or pulse number), and in step S402, instruct the driving unit 204 to respectively transmit hovering driving signals to the identification sensing electrodes in the hovering unit, but not transmit hovering driving signals to the non-identification sensing electrodes in the hovering unit. The identification sensing electrodes of the hovering unit may detect sensing signals and transmit the sensing signals to the sensing unit 208.

Since a sensing signal detected when not touched by the object or not disturbed by noise is different from a sensing signal detected when touched by the object or disturbed by noise and may be equal to a sensing signal reference, in step S404, the sensing device 10 may determine whether a plurality of sensing electrodes RX with sensing signals having signal strength(s) different from the sensing signal reference form an identification pattern, to determine whether the sensing device 10 is touched by the object or disturbed by noise, so as to filter out noise accordingly. For example, the sensing electrode RX11*a*, the sensing electrode RX11*b*, the sensing electrode RX11*c*, the sensing electrode RX11*e*, the sensing electrode RX11*i*, the sensing electrode RX11*m*, the sensing electrode RX11*n* and the sensing electrode RX11*o* of the hovering unit $H_{11}$ all have detected sensing signals with signal strengths different from the sensing signal reference, and form the identification pattern PN1. The processing unit 210 may identify the identification pattern PN1, and determine that the sensing device 10 is touched by the object accordingly. In addition, the processing unit 210 may sum the sensing signals respectively detected by the identification sensing electrodes in the hovering unit as the corresponding hovering sensing signal. The processing unit 210 may perform hovering function output according to the hovering sensing signals.

It may be seen from the above that the processing unit 210 may be used to identify the identification pattern. In addition, the processing unit 210 may be used to detect the sensing signals (also referred to as the first sensing signals) from the identification sensing electrodes of the hovering unit in the hover mode. The processing unit 210 may be used to add up a plurality of sensing signals to obtain a hovering sensing signal. In addition, the processing unit 210 may also be used to detect the sensing signals (also referred to as the second sensing signals) from the identification sensing electrodes of the hovering unit in the touch mode. In one embodiment, the signal strength(s) of the first sensing signals may be less than the signal strength(s) of the second sensing signals.

Figure 5:
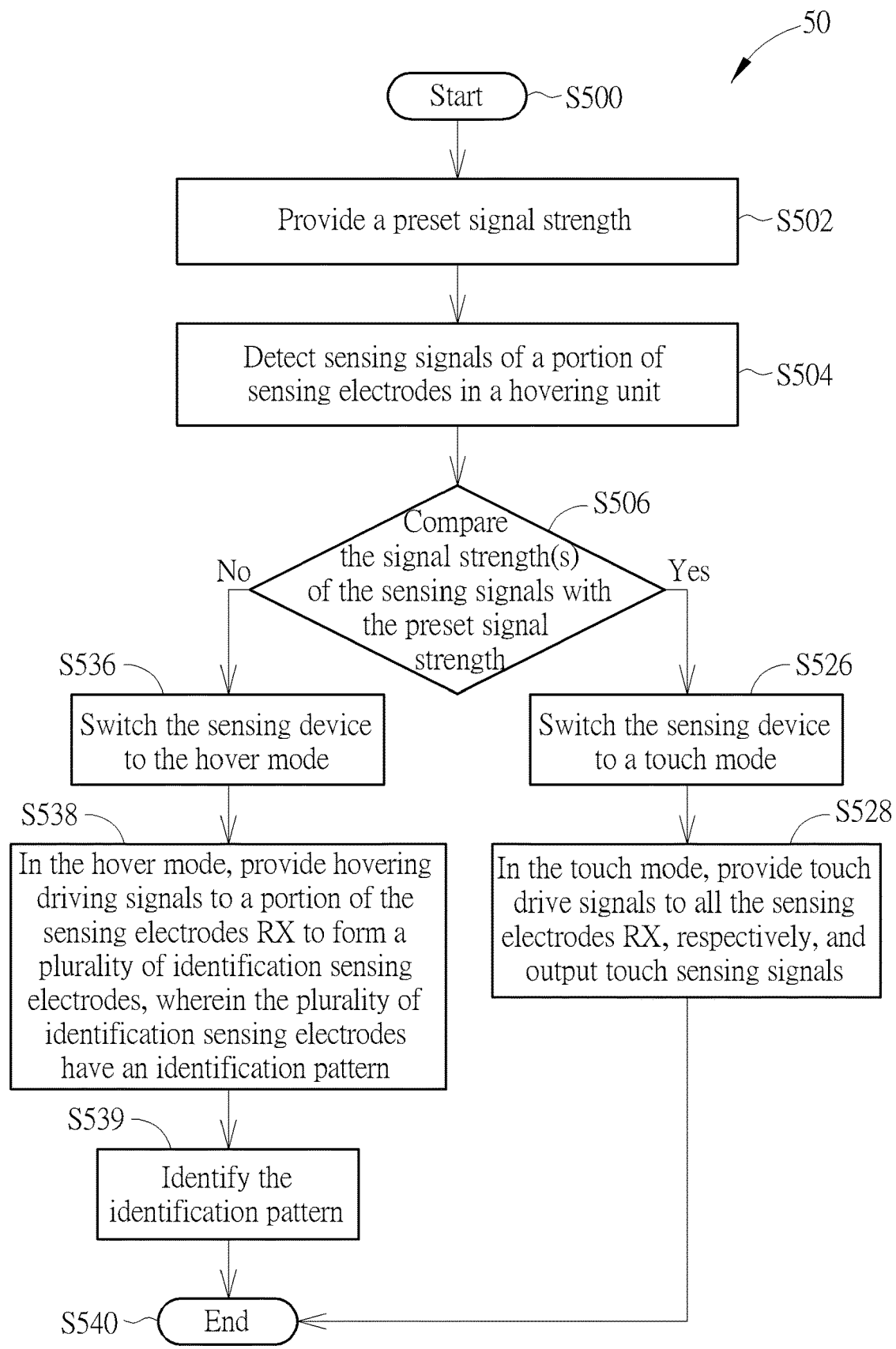
FIG. 5 is a schematic diagram of a sensing method according to an embodiment of the present disclosure.

FIG. 5 is a schematic diagram of a sensing method according to an embodiment of the present disclosure. In some embodiments, the operation of the sensing device 20 may be summarized as the sensing method 50 as shown in FIG. 5, which may include the following steps:

Step S500: Start.
Step S502: Provide a preset signal strength.
Step S504: Detect sensing signals of a portion of sensing electrodes in a hovering unit.
Step S506: Compare the signal strength(s) of the sensing signals with the preset signal strength.

Step S526: Switch the sensing device to a touch mode when detecting that the signal strength(s) of the obtained sensing signal is/are greater than the preset signal strength.

Step S528: In the touch mode, provide touch drive signals to all the sensing electrodes RX, respectively, and output touch sensing signals.

Step S536: Switch the sensing device to the hover mode when the signal strength of the detected sensing signal(s) is/are less than the preset signal strength.

Step S538: In the hover mode, provide hovering driving signals to a portion of the sensing electrodes RX to form a plurality of identification sensing electrodes, wherein the plurality of identification sensing electrodes have an identification pattern.

Step S539: Identify the identification pattern.
Step S540: End.

The steps of the touch panel operation method are described in detail as follows.

In step S502 to step S506, the sensing device 20 decides to operate in the touch mode or the hover mode. In one embodiment, a preset signal strength may be set in step S502. In an initial state, the touch and display driver integration chip 202 may be preset to operate in the touch mode, and the driving unit 204 may respectively transmit touch driving signals to the sensing electrodes RX through the multiplexer 206. In step S504, the multiplexer 206 respectively receives initial sensing signals generated in response to the touch driving signals from the sensing electrodes RX, and then transmits the initial sensing signals from the sensing electrodes RX to the sensing unit 208 to determine the signal strength(s) of the initial sensing signals. The processing unit 210 may determine that the sensing device 20 is subsequently operated in the touch mode or the hover mode according to the signal strength(s) of the initial sensing signals in the initial state. In step S506, when at least one of the plurality of initial sensing signals is greater than the preset signal strength, it is determined that the sensing device 20 is subsequently operated in the touch mode. Then, step S526 is performed, and the sensing device 20 is maintained in the touch mode. According to some embodiments, for example, the preset signal strength may be SS, and when the initial sensing signals are greater than SS, step S526 is performed. For example, the initial sensing signals may be 2 or more times greater than the preset signal strength SS, e.g., the initial sensing signals may be 2 times to 12 times of SS. For example, if the initial sensing signals may be 8 times to 10 times of SS, step S526 is performed, and the sensing device 20 is maintained in the touch mode.

When the plurality of initial sensing signals (or the plurality of touch sensing signals) are all less than the preset signal strength, it is determined that the sensing device 20 is subsequently operated in the hover mode. Then, step S536 is performed, and the sensing device 20 is switched to the hover mode. For example, when the user operates via air, plastic or gloves with a small dielectric constant and thus the initial sensing signals in the touch mode are weak, the plurality of initial sensing signals may all be less than the preset signal strength. Therefore, the sensing device 20 may be switched from the preset touch mode to the hover mode.

In another embodiment, the sensing device 20 may switch from the touch mode to the hover mode. In one embodiment, when the sensing device 20 is operated in the touch mode, it may be determined whether the sensing device 20 is switched to the hover mode according to the signal strength(s) of the plurality of touch sensing signals detected by the sensing electrodes RX. When at least one of the touch sensing signals is greater than the preset signal strength, it is determined that the sensing device 20 is subsequently operated in the touch mode, and the sensing device 20 is maintained in the touch mode. When the touch sensing signals are less than the preset signal strength, it is determined that the sensing device 20 is subsequently operated in the hover mode, and the sensing device 20 is switched to the hover mode.

The following describes how to prove whether a product uses the sensing device of the embodiment of the present disclosure. In one embodiment, an oscilloscope may be utilized for measurement, to determine whether a sensing device product divides the sensing electrodes RX of the hovering unit (such as the hovering unit $H_{11}$) into identification sensing electrodes and non-identification sensing electrodes. For example, the oscilloscope detects signals of a portion of the sensing electrodes RX (such as the sensing electrode RX11$a$, the sensing electrode RX11$b$, the sensing electrode RX11$c$, the sensing electrode RX11$e$, the sensing electrode RX11$i$, the sensing electrode RX11$m$, the sensing electrode RX11$n$ and the sensing electrode RX11$o$), but does not detect signals of the other portion of the sensing electrodes RX (e.g. the sensing electrode RX11$c$, the sensing electrode RX11$f$, the sensing electrode RX11$g$, the sensing electrode RX11$h$, the sensing electrode RX11$k$, the sensing electrode RX11$k$, the sensing electrode RX11$l$ and the sensing electrode RX11$p$), and the sensing electrodes RX with signals always form an identification pattern (e.g., the C-shaped identification pattern PN1). In this way, it may be known that the sensing electrodes RX of the hovering unit (for example, the hovering unit $H_{11}$) in the sensing device are indeed divided into identification sensing electrodes and non-identification sensing electrodes.

In summary, according to some embodiments, the present disclosure groups the sensing electrodes into a plurality of hovering units. The sensing electrodes of the hovering unit of the present disclosure may be divided into identification sensing electrodes and non-identification sensing electrodes. In the hover mode, the identification sensing electrode may have signals, and the non-identification sensing electrode may not have signals. According to some embodiments, the sensing device of the present disclosure may add the sensing signals detected by the identification sensing electrodes of the hovering unit up as the corresponding hovering sensing signal to increase the signal strength. According to some embodiments, the sensing device of the present disclosure may determine whether the detected signals are normal signals or noise according to whether the detected signal strength(s) of the plurality of sensing electrodes forms an identification pattern, and may filter out the noise, thereby improving the signal to noise ratio.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A sensing device, having a hover mode, comprising:
   a substrate; and
   a plurality of sensing electrodes, disposed on the substrate, and defined as a plurality of hovering units in the hover mode, wherein the plurality of hovering units comprise a first hovering unit, wherein in a driving time of the hover mode:
      the first hovering unit comprises a first portion of sensing electrodes receiving hovering driving signals and forming a first identification pattern,
      the first hovering unit comprises non-identification sensing electrodes not receiving hovering driving signals; and
   a processor, wherein in a detecting time of the hover mode, the processor identifies the first identification pattern by determining that all sensing electrodes in the first portion have a detected sensing signal with a signal strength different from a sensing signal reference.

2. The sensing device of claim 1, wherein
   in the hover mode, the plurality of hovering units comprise a second hovering unit, and sensing electrodes with hovering driving signals in the second hovering unit form a second identification pattern, wherein the first identification pattern and the second identification pattern are different.

3. The sensing device of claim 1, wherein
   in the hover mode, the plurality of hovering units further comprise a third hovering unit, and sensing electrodes with hovering driving signals in the third hovering unit form a third identification pattern, wherein the first identification pattern and the third identification pattern are identical.

4. The sensing device of claim 1, wherein the sensing device has a touch mode, and the sensing electrodes of the first hovering unit without hovering driving signals in the hover mode have touch driving signals in the touch mode.

5. The sensing device of claim 1, wherein the sensing device has a touch mode, and the processor detects a first sensing signal of at least one sensing electrode in the first hovering unit in the hover mode, and the processor detects a second sensing signal of the at least one sensing electrode in the first hovering unit in the touch mode, and a signal strength of the first sensing signal is less than a signal strength of the at least one second sensing signal.

6. The sensing device of claim 1, wherein the sensing device has a display mode, and the plurality of sensing electrodes function as a common electrode in the display mode.

7. A sensing method, for a sensing device, wherein the sensing device comprises a substrate, and a plurality of sensing electrodes disposed on the substrate, and the plurality of sensing electrodes are defined as a plurality of hovering units in a hover mode, and the plurality of hovering units comprise a first hovering unit, the sensing method comprising:
   in a driving time of the hover mode:
      providing a first portion of sensing electrodes in the first hovering unit with hovering driving signals to form a first identification pattern;
      providing another portion of sensing electrodes in the first hovering unit with no hovering driving signals to form non-identification sensing electrodes; and
   in a detecting time of the hover mode:
      identifying the first identification pattern by determining that all sensing electrodes in the first portion have a detected sensing signal with a signal strength different from a sensing signal reference.

8. The sensing method of claim 7 comprising:
   providing a preset signal strength;
   detecting a sensing signal of at least one sensing electrode in the first hovering unit; and
   in response to a signal strength of the sensing signal being greater than the preset signal strength, switching the sensing device to a touch mode, and in response to the signal strength of the sensing signal being less than the preset signal strength, switching the sensing device to the hover mode.

9. The sensing method of claim 7, wherein
in the hover mode, the plurality of hovering units comprise a second hovering unit, and sensing electrodes with hovering driving signals in the second hovering unit form a second identification pattern, wherein the first identification pattern and the second identification pattern are different.

10. The sensing method of claim 7, wherein
in the hover mode, the plurality of hovering units further comprise a third hovering unit, and sensing electrodes with hovering driving signals in the third hovering unit form a third identification pattern, wherein the first identification pattern and the third identification pattern are identical.

11. A electronic device, comprising:
a sensing device, having a hover mode, comprising:
   a substrate; and
   a plurality of sensing electrodes, disposed on the substrate, and defined as a plurality of hovering units in the hover mode, wherein the plurality of hovering units comprise a first hovering unit, wherein in a driving time of the hover mode:
      the first hovering unit comprises a first portion of sensing electrodes receiving hovering driving signals and forming a first identification pattern,
      the first hovering unit comprises non-identification sensing electrodes not receiving hovering driving signals; and
   a processor, wherein in a detecting time of the hover mode, the processor identifies the first identification pattern by determining that all sensing electrodes in the first portion have a detected sensing signal with a signal strength different from a sensing signal reference.

12. The electronic device of claim 11, wherein
in the hover mode, the plurality of hovering units comprise a second hovering unit, and sensing electrodes with hovering driving signals in the second hovering unit form a second identification pattern, wherein the first identification pattern and the second identification pattern are different.

13. The electronic device of claim 11, wherein
in the hover mode, the plurality of hovering units further comprise a third hovering unit, and sensing electrodes with hovering driving signals in the third hovering unit form a third identification pattern, wherein the first identification pattern and the third identification pattern are identical.

14. The electronic device of claim 11, wherein the sensing device has a touch mode, and the sensing electrodes of the first hovering unit without hovering driving signals in the hover mode have touch driving signals in the touch mode.

15. The electronic device of claim 11, wherein the sensing device has a touch mode, and the processor detects a first sensing signal of at least one sensing electrode in the first hovering unit in the hover mode, and the processor detects a second sensing signal of the at least one sensing electrode in the first hovering unit in the touch mode, and a signal strength of the first sensing signal is less than a signal strength of the at least one second sensing signal.

16. The electronic device of claim 11, wherein the sensing device has a display mode, and the plurality of sensing electrodes function as a common electrode in the display mode.

* * * * *